UNITED STATES PATENT OFFICE 2,446,976

STABILIZATION OF VINYL RESINS

Edward Cousins, Akron, Ohio, assignor to Wingfoot Corporation, Akron, Ohio, a corporation of Delaware No Drawing. Application August 28, 1944,
Serial No. 551,618

3 Claims. (Cl. 260—23)

This application relates to methods of retarding the discoloration which occurs on heating vinyl resins. More particularly, it relates to the incorporation of stabilizing compounds into vinyl chloride polymer and vinyl chloride copolymer resins.

If vinyl resins, particularly those containing vinyl chloride as the principal constituent, are milled in conventional heated roll mills, they will frequently develop strong yellow or brown colors, and in some instances, especially at temperatures in excess of 300° F., they may become charred. It is the purpose of this invention to provide a method whereby the vinyl chloride polymers may be mixed on hot mills and still maintain their normal transparent colorless condition. A further purpose of this invention is to provide new polymeric compositions which may be heated to temperatures in excess of 300° F. without discoloration.

If a vinyl chloride resin is compounded on a roll mill heated to 300° F. with a small proportion of zinc stearate, the resin will immediately become black and charred. It has also been noticed that if the same vinyl resins are compounded with alkali metal stearates or with alkaline earth metal stearates in place of the zinc stearate, no appreciable improvement over the disadvantageous discoloration of the uncompounded vinyl resin results. On the other hand, if both zinc stearate and an alkali metal or alkaline earth metal stearate are added, a resin composition is secured which is very stable to heat and which will not char or otherwise discolor when mixed on a hot mill.

This invention is adapted to the purpose of stabilizing vinyl resins which contain vinyl chloride as a substantial constituent. Thus, copolymers of vinyl chloride with, for example, vinyl acetate, methyl methacrylate, vinylidene chloride an alkyl maleate or an alkyl fumarate may be treated in accordance with this invention. Similarly, plasticized polyvinyl chloride may be so stabilized.

A preferred group of materials suitable for the practice of this invention are the vinyl resins, which contain vinyl chloride in amount from 50 to 100 percent of the polymer. Thus up to 50 percent of a single comonomer or a plurality of comonomers totaling up to 50 percent may be present. The copolymers containing 80 to 95 percent of vinyl chloride and 5 to 20 percent of a comonomer as above described preferably vinyl acetate, are particularly useful.

In accordance with this invention, the vinyl resin, which may contain a plasticizer, or any of the other conventional resin compounding materials, is mixed with zinc stearate and the alkali metal or alkaline earth metal stearate at temperatures substantially below 200° F. The two stearates may be thus added either separately or simultaneously. In the case of a tough resin which requires mixing at temperatures of 300° F. or higher, it is desirable that the zinc stearate and the alkali metal or alkaline earth metal stearate be intimately mixed prior to the incorporation with the vinyl resin. Although any quantity of the zinc stearate and the alkali metal or alkaline earth metal stearate may be used to achieve a beneficial result, the use of 0.5% to 10% of each is preferred. Most of the desirable compounding formulae will fall within this range. It has been found that best results are achieved by using from 2% to 5% of each of the two stearates.

Magnesium stearate used in conjunction with zinc stearate is operative in the practice of this invention. Accordingly, it is intended that the expression "alkaline earth metal" shall include magnesium, consistent with approved chemical nomenclature. Among the alkali metal and alkaline earth metal stearates may be mentioned those of potassium, sodium, strontium, calcium and barium, of which the barium stearate is preferred.

Further details of the practice of this invention will be apparent in the following examples.

Example 1

A copolymer (100 parts by weight) containing 93% vinyl chloride and 7% vinyl acetate was mixed with 45% dibutyl phthalate on a hot roll mill heated to about 300° F. A small amount of zinc stearate was added and the resin immediately became discolored. Further addition of zinc stearate caused the resin to become completely charred.

Example 2

A composition containing 100 parts by weight of a copolymer identical to that used in Example 1 and 60 parts of dibutyl phthalate was mixed on a hot mill at a temperature of about 300° F. The mixture was transparent and substantially colorless at the start, but gradually developed a yellow discoloration. Five parts of barium stearate were then added and the discoloration increased slightly.

Examples 1 and 2 above demonstrate that neither zinc stearate nor barium stearate alone have any beneficial effect on the color stabilization at elevated temperature.

*Example 3*

A composition containing 100 parts by weight of a copolymer consisting of 93% vinyl chloride and 7% of vinyl acetate, 60 parts of dibutyl phthalate, 3 parts of zinc stearate and 5 parts of barium stearate, was prepared by mixing the copolymer and plasticizer first and subsequently adding a mixture of the zinc and barium stearates. The compound was thoroughly mixed at 300° F. on a roll mill for a period of over 20 minutes. No discoloration was observed.

*Example 4*

A composition consisting of 100 parts by weight of a copolymer containing 93% vinyl chloride and 7% vinyl acetate was mixed on the hot roll mill with 60 parts of dibutyl phthalate, 1.5 parts zinc stearate and 1 part of barium stearate. A transparent stock entirely free of discoloration was obtained upon first mixing. Even after standing for 20 minutes at 300° F. only a slight discoloration was noticeable.

*Example 5*

A copolymer (100 parts by weight) containing 90% vinyl chloride and 10% vinylidene chloride was mixed with 60 parts of dibutyl phthalate and the milled composition divided into two portions. To one portion 1.5 parts of zinc stearate and one part of barium stearate were added and thoroughly milled into the composition. The second part of the plasticized resin was used as a control. The two compositions were then milled separately at 300° F. The composition which did not contain the stearates became cloudy and quite yellow and some decomposition, as evidenced by the evolution of gas, was noticed. The composition containing the stearates was substantially clearer and no gas formation was observed. After a ten minute bake at 300° F., the unstabilized composition darkened severely, while the composition containing the stearates developed only a slight yellowish discoloration.

*Example 6*

100 parts of polyvinyl chloride was plasticized with 60 parts of dibutyl phthalate and thoroughly milled. The composition was then divided into two parts, one of which was stabilized with 1.5 parts of zinc stearate and one part of barium stearate. The stearates were added in the composition while being milled at 300° F. The unstabilized resin became quite dark during the milling operation, while the stabilized composition remained transparent.

Although the invention has been described with respect to specific examples, it is not intended that the details thereof shall be construed as limitations upon the scope of the invention except to the extent incorporated in the following claims.

I claim:

1. A resin composition color-stable at 300° F. which comprises a resin containing polymeric vinyl chloride as its principal constituent, from 0.5% to 10% (based on the resin) of zinc stearate and from 0.5% to 10% (based on the resin) of a stearate of a metal of the group consisting of the alkali metals and the alkaline earth metals.

2. A resin composition color-stable at 300° F. which comprises a resin containing polymeric vinyl chloride as its principal constituent, with 2% to 5% (based on the resin) of zinc stearate and 2% to 5% (based on the resin) of a stearate of a metal of the group consisting of the alkali metals and the alkaline earth metals.

3. A resin composition color-stable at 300° F. which comprises a resin containing polymeric vinyl chloride as its principal constituent, from 0.5% to 10% (based on the resin) of zinc stearate and from 0.5% to 10% (based on the resin) of barium stearate.

EDWARD COUSINS.

REFERENCES CITED

The following references are of record in the file of this patent:

UNITED STATES PATENTS

| Number | Name | Date |
|---|---|---|
| 1,966,856 | Groff | July 17, 1934 |
| 1,990,903 | Groff | Feb. 12, 1935 |
| 2,157,997 | Brous | May 9, 1939 |
| 2,367,629 | Teppema | Jan. 16, 1945 |